(12) United States Patent
Xu et al.

(10) Patent No.: US 11,496,007 B2
(45) Date of Patent: Nov. 8, 2022

(54) PERMANENT MAGNET MOTOR AND COMPRESSOR

(71) Applicant: ANHUI MEIZHI PRECISION MANUFACTURING CO., LTD., Anhui (CN)

(72) Inventors: Fei Xu, Anhui (CN); Xiaohua Qiu, Anhui (CN); Zhengzhong Qiao, Anhui (CN)

(73) Assignee: ANHUI MEIZHI PRECISION MANUFACTURING CO., LTD., Wuhu (CN)

( * ) Notice: Subject to any disclaimer, the term of this patent is extended or adjusted under 35 U.S.C. 154(b) by 275 days.

(21) Appl. No.: 16/731,303

(22) Filed: Dec. 31, 2019

(65) Prior Publication Data
US 2020/0153290 A1  May 14, 2020

Related U.S. Application Data

(63) Continuation of application No. PCT/CN2018/087602, filed on May 21, 2018.

(30) Foreign Application Priority Data

Dec. 27, 2017 (CN) .......................... 201711440842.9
Dec. 27, 2017 (CN) .......................... 201721855894.8

(51) Int. Cl.
*H02K 1/17* (2006.01)
*H02K 1/16* (2006.01)
(Continued)

(52) U.S. Cl.
CPC ................. *H02K 1/17* (2013.01); *H02K 1/16* (2013.01); *H02K 3/28* (2013.01); *H02P 25/22* (2013.01)

(58) Field of Classification Search
CPC .. H02K 1/16; H02K 1/17; H02K 3/28; H02K 2213/03
See application file for complete search history.

(56) References Cited

U.S. PATENT DOCUMENTS 5,686,774 A  11/1997  Slavik et al.
6,570,289 B1  5/2003  Liang et al.
(Continued)

FOREIGN PATENT DOCUMENTS

CN  2492000 Y  5/2002
CN  1753279 A  3/2006
(Continued)

OTHER PUBLICATIONS

Extended European Search Report dated Nov. 3, 2020 received in European Patent Application No. EP 18897730.0.
(Continued)

*Primary Examiner* — Quyen P Leung
*Assistant Examiner* — Minki Chang
(74) *Attorney, Agent, or Firm* — Scully Scott Murphy & Presser

(57) ABSTRACT

A permanent magnet motor and a compressor are provided. The motor has a rotor, a stator core, and a stator winding. A plurality of coupled coils are disposed on the stator core. The coil includes a first type coil and a second type coil. The stator winding is a three-phase stator winding. Each phase of the stator winding is provided with three joints In each phase, a first joint and a second joint are disposed on the first type coil, a third joint in the stator winding of each phase is disposed on the second type coil. The permanent magnet motor provided by the present disclosure can improve the efficiency of the motor and reduce noise.

8 Claims, 13 Drawing Sheets

(51) Int. Cl.
*H02K 3/28* (2006.01)
*H02P 25/22* (2006.01)

(56) References Cited

U.S. PATENT DOCUMENTS

| | | | |
|---|---|---|---|
| 2005/0017592 | A1 | 1/2005 | Fukushima |
| 2015/0326084 | A1 | 11/2015 | Yamaguchi et al. |
| 2016/0149461 | A1* | 5/2016 | Kono .................. H02K 1/2733 310/86 |
| 2016/0336884 | A1* | 11/2016 | Matsuoka ................ H02P 6/10 |
| 2017/0279320 | A1* | 9/2017 | Legranger ............ H02K 1/2706 |
| 2018/0219438 | A1* | 8/2018 | Oikawa ................ H02K 1/2753 |
| 2020/0153304 | A1* | 5/2020 | Xu .......................... H02K 3/28 |

FOREIGN PATENT DOCUMENTS

| | | | |
|---|---|---|---|
| CN | 1756042 | A | 4/2006 |
| CN | 1871763 | A | 11/2006 |
| CN | 201194347 | Y | 2/2009 |
| CN | 104854776 | A | 8/2015 |
| CN | 106208435 | A | 12/2016 |
| CN | 107465279 | A * | 12/2017 |
| DE | 10 2013 112 086 | A1 | 5/2014 |
| JP | H06-133483 | A | 5/1994 |
| JP | 2010-104112 | A | 5/2010 |
| JP | 2011-045193 | A | 3/2011 |
| JP | 2017-093097 | A | 5/2017 |
| WO | WO-2016085643 | A1 * | 6/2016 ............. H02K 53/00 |

OTHER PUBLICATIONS

Notice of Reasons for Refusal dated Jan. 12, 2021 received in Japanese Patent Application No. JP 2020-520699 together with an English language translation.

International Search Report dated Sep. 26, 2018 issued in PCT/CN2018/087602, together with English translation.

Notification of the First Office Action dated Oct. 19, 2018 received in Chinese Patent Application 201711440842.9, together with English translation.

The Second Office Action dated May 22, 2019 received in Chinese Patent Application 201711440842.9, together with English translation.

The Third Office Action dated Aug. 22, 2019 received in Chinese Patent Application 201711440842.9, together with English translation.

Examination Report dated Aug. 24, 2020 received in Indian Patent Application No. IN 201947051477.

Communication pursuant to Article 94(3) EPC dated Mar. 7, 2022 received in European Patent Application No. EP 18 897 730.0.

* cited by examiner

PERMANENT MAGNET MOTOR AND COMPRESSOR

CROSS-REFERENCES TO RELATED APPLICATIONS

The present disclosure is a continuation application of PCT/CN2018/087602 filed on May 21, 2018 and claims the priority of Chinese Patent Application No. 201711440842.9 and 201721855894.8, filed with the Chinese Patent Office on Dec. 27, 2017 and entitled "PERMANENT MAGNET MOTOR AND COMPRESSOR", the entire contents of each of which are herein incorporated by reference for all purposes. No new matter has been introduced.

FIELD

The present disclosure relates to the field of compressor technology, in particular to a permanent magnet motor and a compressor.

BACKGROUND

In a conventional rotary DC inverter compressor adopting permanent magnet motor, a harmonic magnetic potential exists in the magnetic potential generated by each phase current. The low-order harmonic magnetic potential of the harmonic magnetic potential is particularly critical. These harmonic magnetic potentials synthesize rotating harmonic magnetic potentials, which elevate the temperature rise of the motor, increase the motor noise, reduce the power factor, and reduce the efficiency.

In order to reduce the motor noise, many methods for optimizing harmonic radial electromagnetic force have been currently used in the industry. However, once the pole slot fit of the motor has been determined, the lowest order radial electromagnetic force is always present, and thus the effect of optimization is not obvious. In addition, the harmonic radial electromagnetic forces are generated by harmonic magnetic-density interactions, which also affect motor efficiency.

SUMMARY

The present disclosure aims to solve at least one of the technical problems existing in the prior art or related art.

To this end, the first aspect of the present disclosure provides a permanent magnet motor.

The second aspect of the present disclosure provides a compressor.

In view of this, according to the first aspect of the present disclosure, providing a permanent magnet motor, comprising: a rotor; and a stator core, including: a stator body, having a columnar shape; two or more stator teeth, wherein the stator teeth are spaced apart along a circumferential direction of the stator body; and a stator slot, defined by two adjacent stator teeth; the permanent magnet motor further includes: a stator winding, including a plurality of coupled coils, the coils are disposed in the stator slot and are wound around the stator teeth, the coils include a first type coil and a second type coil, the stator winding is three-phase stator winding, each phase of the stator winding is provided with at least three joints, and including a first joint, a second joint, and a third joint, and in the stator winding of each phase, the first joint and the second joint are disposed on the first type coil, the third joint in the stator winding of each phase is disposed on the second type coil, wherein the first joint in the stator winding of each phase is connected to the second joint in the stator winding of an adjacent phase; in the stator winding of each phase, the second type coil is connected to the first type coil, the third joint in the stator winding of each phase is connected to the corresponding three-phase power lead or the third joint in the stator winding of the other phase.

The permanent magnet motor of the present disclosure, the coil of the stator winding includes the first type coil and the second type coil, wherein from the perspective of different phase stator winding, the first joint on the first type coil is connected to the second joint on the first type coil of the adjacent phase, that is, the first type coil is connected by the end-to-end connection between the adjacent phases, that is, the angular connection is used; the second type coil is connected to the first type coil of the same phase, and when the second type coil is connected to the first type coil through the first joint or the second joint, the second type coil and the first type coil of the same phase and the first type coil of the adjacent phase connected to the two at the same time form a star connection, when the second type coil is connected in the first type coil, the first type coil and the second type coil in the same phase form a star connection, and further, on the second type coil the third joint also has two connections, one is connected to the corresponding three-phase power lead, as the terminal of the power supply, and the other is connected to the third joint of the other phase, that is, star connection with tail-to-tail connection between the three phases. The present disclosure adopts a combination of an angular connection and a star connection, compared with the conventional single-layer cross-type and concentric winding, which can reduce the copper loss and harmonic additional loss of the stator winding and improve the efficiency of the motor, and can also obtain the beneficial effects of reducing motor vibration and noise.

In addition, the permanent magnet motor in the above technical solution provided by the present disclosure may further have the following additional technical features:

the ratio N2/N1 of the number of turns N2 of the second type coil and the number of turns N1 of the first type coil is in a value range of $0.49 \leq N2/N1 \leq 0.6$; the ratio d2/d1 of the bare wire diameter d2 of the second type coil and the bare wire diameter d1 of the first type coil is in a value range of $1.1 \leq d2/d1 \leq 1.6$.

In this technical solution, the relationship between the number of turns of two types of coils and the bare wire diameter is specifically defined. When the coil turns are the same, the potential and magnetic potential generated by the angularly connected coil are 1.732 times lower than the potential and magnetic potential generated by the star-connected coil, causing a difference between the induced potential and the magnetic potential, by increasing the number of turns of the angularly connected coil (i.e. the first type coil), it helps to compensate for the potential and magnetic potential difference of the first type coil, making the potential and the magnetic potential of the first type coil and the second type coil more balanced. Since the size of each stator slot is equal, by limiting the value of d2/d1 to be greater than 1, the bare wire diameter d1 of the first type coil can be reduced to correspondingly increase the number of turns N1 of the first type coil disposed in the stator slot to satisfy the ratio of the aforementioned turns.

In any of the above technical solutions, for example, the ratio T2/T1 of the number T2 of the second type coil and the number T1 of the first type coil is in a value range of $0.4 \leq T2/T1 \leq 1$.

In this technical solution, the number ratio of the second type coil and the first type coil is properly limited, when T2/T1 is 1, the two types of coils are equal in number, which ensures the balance of the overall structure and the reliability of the operation of the permanent magnet motor; limiting the lower limit of T2/T1 to 0.4, it avoids the imbalance of the overall structure caused by the difference in the number of coils between the two types, and increases the flexibility of setting the number of coils.

In any of the above technical solutions, for example, when the number of the stator teeth that one of the coils spans is greater than or equal to three, the number Z of the stator slot and the number P of pole pairs of the rotor satisfy Z/P=6 or 12 or 16 or 18.

In this technical solution, the ratio relationship between the number Z of the stator slot and the number P of the pole pairs of the rotor is defined, that is, the pole slot fit of the permanent magnet motor is defined, the number of the pole pairs of the rotor is P, then the number of the pole of the rotor is 2P, that is, the number of the stator slot is 3 times, 6 times, 8 times or 9 times the number of the pole pairs of the rotor, such as a 4-pole 12-slot motor, a 4-pole 24-slot motor, a 4-pole 36-slot motor, and a 6-pole 18-slot motor, especially the motors with a number of stator slot of four, such motors can realize the above-mentioned wiring form, so that the magnetic potential distribution generated by the stator winding is uniform, which helps to reduce harmonic rotating magnetic potential and reduce vibration noise.

In any of the above technical solutions, for example, when the number of the stator teeth that one of the coils spans is equal to one, the number Z of the stator slot and the number P of pole pairs of the rotor satisfy Z/P=2.4 or 9/4 or 12/7.

In this technical solution, the ratio relationship between the number Z of the stator slot and the number P of the pole pairs of the rotor is defined, that is, the pole slot matching of the permanent magnet motor of the fractional slot concentrated winding is further defined, wherein the number of the pole pairs of the rotor is P, the number of poles of the rotor is 2P, for example, a 10-pole 12-slot motor and a 14-pole 12-slot motor, the slot-fitted motor can achieve the effect of a multi-phase motor, which can significantly weaken the amplitude of low-order harmonic magnetic field, reduce vibration noise and improve motor performance.

In any of the above technical solutions, for example, the rated torque T of the permanent magnet motor, the inner diameter Di of the stator body, and the unit volume torque TPV of the rotor satisfy $5.18 \times 10^{-7} \leq T \times Di^{-1} \times TPV^{-1} \leq 1.17 \times 10^{-6}$, wherein the unit of the rated torque T is N·m, the unit of the inner diameter Di is mm, the unit of the unit volume torque TPV is kN·m·m$^{-3}$, and the unit volume torque TPV is in a value range of $5 \text{ kN·m·m}^{-3} \leq TPV \leq 45 \text{ kN·m·m}^{-3}$.

In this technical solution, the value range of the combined variable of the rated torque T of the permanent magnet motor, the inner diameter Di of the stator body, and the unit volume torque TPV of the rotor is defined, and the value range of the unit volume torque TPV is also limited, so that the permanent magnet motor can meet the power needs of the compressor field, correspondingly, for the compressor using the permanent magnet motor, the copper loss and harmonic additional loss of the stator winding can be effectively reduced, the motor efficiency is improved, and the vibration and noise of the motor are reduced.

In any of the above technical solutions, for example, the outer diameter Do of the stator core is in a value range of 60 mm≤Do≤160 mm.

In this technical solution, the value range of the outer diameter Do of the stator core is properly defined, and the lower limit value ensures that the number of the stator slot is constant, and the width is sufficient to insert a sufficient number of turns of coils to ensure the normal operation of the permanent magnet motor, the upper limit value avoids the space occupation caused by the excessive size of the permanent magnet motor, so that the permanent magnet motor is adapted to the compressor in the domestic and commercial refrigeration systems.

In any of the above technical solutions, for example, the rated rotational speed n of the permanent magnet motor is in a value range of n≥3600 rpm.

In this technical solution, the rated rotational speed of the conventional permanent magnet motor is 3,600 rpm, and the permanent magnet motor defined by the present disclosure can achieve effective noise reduction effect and significantly improve the performance of the high-speed permanent magnet motor when applied to high-speed working conditions.

In any one of the above aspects, for example, the rotor includes a rotor core and a magnetic member, the rotor core includes a slot, and the number of the slot is at least one, and all of the slots are spaced apart along a circumferential direction of the rotor core, the magnetic member is disposed in the slot.

In this technical solution, a magnetic member setting scheme of the rotor is properly defined. By processing the slot on the rotor core, it is possible to provide a mounting position for the magnetic member, facilitating the positioning and assembly of the magnetic member.

In any of the above aspects, for example, the rotor includes a rotor core and a magnetic member, the number of the magnetic member is plural, the magnetic member has a sheet shape, and the cross section of the magnetic member has a circular arc shape, and the magnetic member is attached to the outer wall of the rotor core.

In this technical solution, another magnetic member setting scheme of the rotor is properly defined. Attaching the circular arc-shaped magnetic member to the outer wall of the rotor core simplifies the structure of the rotor core and reduces the processing process of the rotor core.

In any of the above aspects, for example, the rotor includes a rotor core and a magnetic member, the magnetic member has a cylindrical shape, and is sleeved on an outer wall of the rotor core.

In this technical solution, another magnetic member setting scheme of the rotor is properly defined. The cylindrical shaped magnetic member is sleeved on the rotor core, which simplifies the structure of the rotor core and reduces the processing process of the rotor core, on the other hand, the magnetic member is directly disposed on the rotor core as a whole, which is convenient for assembly.

According to the second aspect of the present disclosure, a compressor is provided, comprising a permanent magnet motor as described in any one of the above aspects.

The compressor provided by the present disclosure includes the permanent magnet motor described in any of the above technical solutions, and thus has all the beneficial effects of the permanent magnet motor, and details are not described herein again.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the following description of embodiments in conjunction with the drawings.

Figure 1:
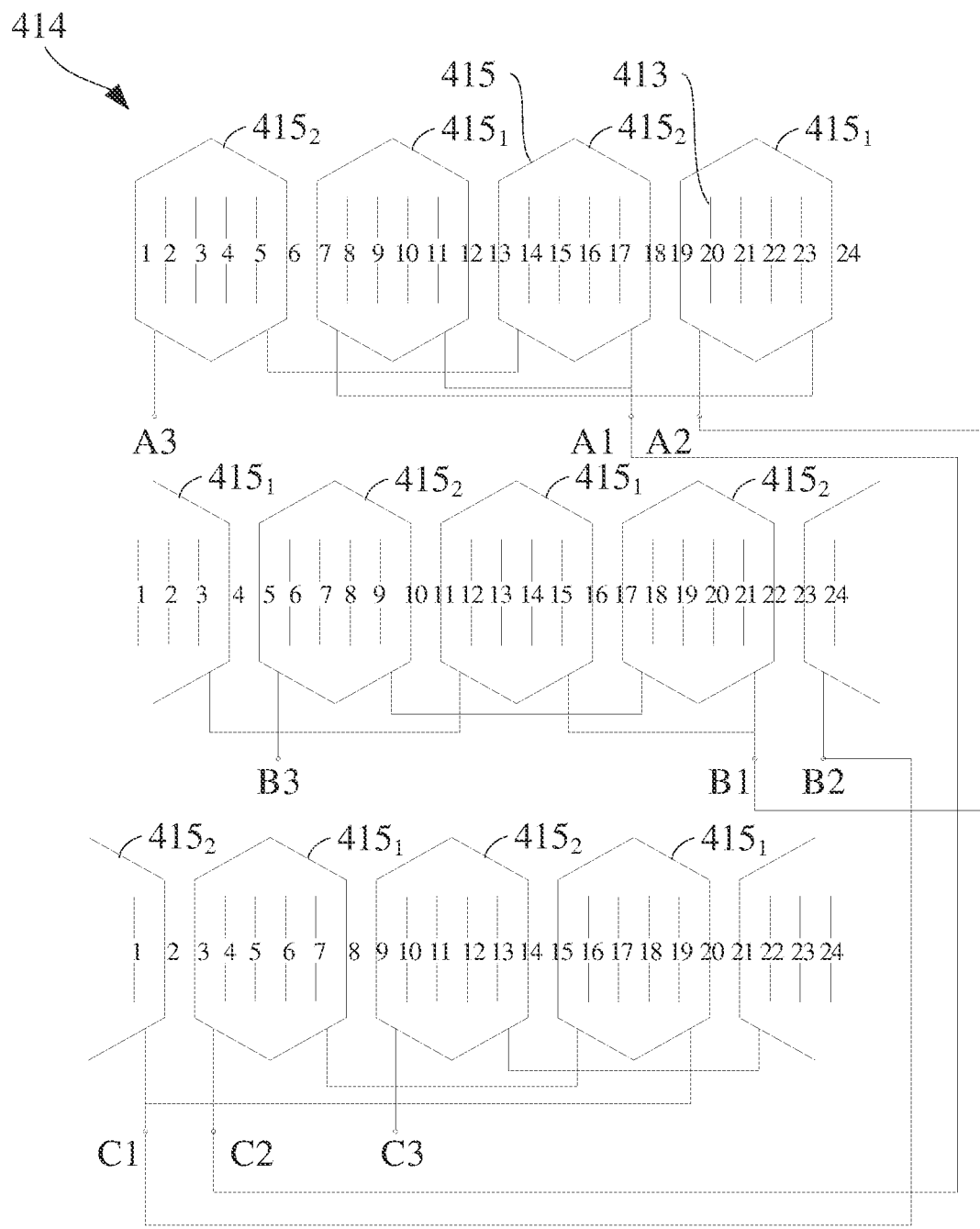
FIG. 1 is a wiring schematic diagram of the stator winding in the first embodiment of the present disclosure.

The corresponding relationship between the reference signs and component names in FIG. 1 to FIG. 15 are as follows:

40 a compressor, 41 a permanent magnet motor, 411 a rotor, 412 a stator core, 413 a stator slot, 414 a stator winding, 415 a coil, A1 a first phase first joint, A2 a first phase second joint, A3 a first phase third joint, B1 a second phase first joint, B2 a second phase second joint, B3 a second phase third joint, C1 a third phase first joint, C2 a third phase second joint, C3 a third phase third joint, A1-1 a first phase first group first joint, A1-2 a first phase second group first joint, A2-1 a first phase first group second joint, A2-2 a first phase second group second joint, A3-1 a first phase first group third joint, A3-2 a first phase second group third joint, B1-1 a second phase first group first joint, B1-2 a second phase second group first joint, B2-1 a second phase first group second joint, B2-2 a second phase second group second joint, B3-1 a second phase first group third joint, B3-2 a second phase second group third joint, C1-1 a third phase first group first joint, C1-2 a third phase second group first joint, C2-1 a third phase first group second joint, C2-2 a third phase second group second joint, C3-1 a third phase first group third joint, C3-2 a third phase second group third joint, 42 a case, 43 a crankshaft, 44 a cylinder, 45 a piston, 46 a main bearing, 47 an auxiliary bearing, 50 a gas-liquid separator.

DETAILED DESCRIPTION OF EXEMPLARY EMBODIMENTS

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

A permanent magnet motor 41 and a compressor 40 according to some embodiments of the present disclosure are described below with reference to FIGS. 1 to 14.

As shown in FIG. 1 to FIG. 11 and FIG. 14, an embodiment of the first aspect of the present disclosure provides a permanent magnet motor 41, comprising: a rotor 411, a stator core 412, and a stator winding 414. The stator core 412 includes a stator body (not shown), a stator teeth (not shown), and a stator slot 413. The stator body has a column shape, a plurality of stator teeth are spaced apart along a circumferential direction of the stator body. The stator slot 413 is defined by two adjacent stator teeth. The stator winding 414 includes a plurality of coils 415 connected to each other. The coils 415 are disposed in the stator slot 413 and are wound around the stator teeth, and the coils 415 include a first type coil and a second type coil. Examples of first type coils are labeled in FIGS. 1-11 as coils 4151 and examples of second type coils are labeled in FIGS. 1-11 as coils 4152. The stator winding 414 is a three-phase stator winding, and each phase of the stator winding is provided with three joints including a first joint, a second joint and a third joint. For example, the stator winding 414 can include a first phase first joint A1, a first phase second joint A2, a first phase third joint A3, a second phase first joint B1, a second phase second joint B2, a second phase third joint B3, a third phase first joint C1, a third phase second joint C2, and a third phase third joint C3. The first joint and the second joint in each phase of the stator winding are disposed on the first type coil, and the third joint in each phase of the stator winding is disposed on the second type coil. That is, in each phase of the stator winding, the coils 415 between the first joint and the second joint are the first type coil, and the remaining coils 415 are the second type coil; wherein the first joint in the stator winding of each phase is connected to the second joint in the stator winding of the adjacent phase; in the stator winding of each phase, the second type coil is connected to the first type coil, and the third joint in the stator winding of each phase is connected to the corresponding three-phase power lead or the third joint in the stator winding of the other phase.

According to an exemplary permanent magnet motor 41 of the present disclosure, the coils 415 of the stator winding 414 includes the first type coil and the second type coil. For example, for the different phase stator windings, the first joint of the first type coil is connected to the second joint of the first type coil of the adjacent phase, that is, the first type coil is connected by the end-to-end connection between the adjacent phases, that is, the angular connection is used. The second type coil is connected to the first type coil of the same phase. When the second type coil is connected to the first type coil through the first joint or the second joint, the second type coil and the first type coil of the same phase and the first type coil of the adjacent phase connected to the two at the same time form a star connection. When the second type coil is connected in the first type coil, the first type coil and the second type coil in the same phase form a star connection. a Furthermore, the third joint of the second type coil also has two connections, one being connected to the corresponding three-phase power lead as the terminal of the power supply and the other being connected to the third joint of the other phase, that is, star connection with tail-to-tail connection between the three phases. The present disclosure adopts a combination of an angular connection and a star connection. The combination, compared with the conventional single-layer cross-type and concentric winding, can reduce the copper consumption and harmonic additional loss of the stator winding 414 and improve the efficiency of the motor, and can also obtain the beneficial effects of reducing motor vibration and noise. The derivation process of the magnetic potential of the stator winding 414 is defined by the following:

$$\begin{cases} I_1 = I \cos \omega t \\ I_2 = I \cos(\omega t - 30°) \\ I_3 = I \cos(\omega t - 120°) \\ I_4 = I \cos(\omega t - 150°) \\ I_5 = I \cos(\omega t - 240°) \\ I_6 = I \cos(\omega t - 270°) \end{cases}$$

$$\begin{cases} F_1 = f_1 \cos \alpha + f_3 \cos 3\alpha + f_5 \cos 5\alpha + \cdots \\ F_2 = f_1 \cos(\alpha - 30°) + f_3 \cos 3(\alpha - 30°) + f_5 \cos 5(\alpha - 30°) + \cdots \\ F_3 = f_1 \cos(\alpha - 120°) + f_3 \cos 3(\alpha - 120°) + f_5 \cos 5(\alpha - 120°) + \cdots \\ F_4 = f_1 \cos(\alpha - 150°) + f_3 \cos 3(\alpha - 150°) + f_5 \cos 5(\alpha - 150°) + \cdots \\ F_5 = f_1 \cos(\alpha - 240°) + f_3 \cos 3(\alpha - 240°) + f_5 \cos 5(\alpha - 240°) + \cdots \\ F_6 = f_1 \cos(\alpha - 270°) + f_3 \cos 3(\alpha - 270°) + f_5 \cos 5(\alpha - 270°) + \cdots \end{cases}$$

$$\begin{cases} F_1(\alpha, t) = F_1 I_1 = [f_1 \cos \alpha + f_3 \cos 3\alpha + f_5 \cos 5\alpha + \ldots] I \cos \omega t \\ F_2(\alpha, t) = F_2 I_2 = [f_1 \cos(\alpha - 30°) + f_3 \cos 3(\alpha - 30°) + f_5 \cos 5(\alpha - 30°) + \ldots] I \cos(\omega t - 30°) \\ F_3(\alpha, t) = F_3 I_3 = [f_1 \cos(\alpha - 120°) + f_3 \cos 3(\alpha - 120°) + f_5 \cos 5(\alpha - 120°) + \ldots] I \cos(\omega t - 120°) \\ F_4(\alpha, t) = F_4 I_4 = [f_1 \cos(\alpha - 150°) + f_3 \cos 3(\alpha - 150°) + f_5 \cos 5(\alpha - 150°) + \ldots] I \cos(\omega t - 150°) \\ F_5(\alpha, t) = F_5 I_5 = [f_1 \cos(\alpha - 240°) + f_3 \cos 3(\alpha - 240°) + f_5 \cos 5(\alpha - 240°) + \ldots] I \cos(\omega t - 240°) \\ F_6(\alpha, t) = F_6 I_6 = [f_1 \cos(\alpha - 270°) + f_3 \cos 3(\alpha - 270°) + f_5 \cos 5(\alpha - 270°) + \ldots] I \cos(\omega t - 270°) \end{cases}$$

$$F = F_1(\alpha, t) + F_2(\alpha, t) + F_3(\alpha, t) + F_4(\omega, t) + F_5(\omega, t) + F_6(\alpha, t) = 3f_1 I \cos(\alpha - \omega t) + 3f_{11} I \cos(11\alpha + \omega t) + 3f_{13} I \cos(13\alpha - \omega t) + \cdots + 3f_{(12n-11)} I \cos[(12n - 11)\alpha - \omega t] + 3f_{(12n-11)} I \cos[(12n - 1)\alpha + \omega t] + \cdots$$

It can be seen from the formula derivation that with the connection manner of the stator winding 414 of the present disclosure, the potential low-order harmonic rotating magnetic potential on the armature magnetic field side, which exists in the known devices, is eliminated. As a result of this configuration, the performance of the permanent magnet motor 41 adopting this connection method is superior to that of the ordinary three-phase permanent magnet motor.

As shown in FIG. 1, in the first embodiment of the present disclosure, a connection manner of a stator winding 414 of a 4-pole 24-slot motor is provided, and the 24-slot can accommodate 12 of the coils 415, 4 for each phase. There are two of the first type coils between the first phase first joint A1 and the first phase second joint A2, and there are two of the second type coils between the first phase third joint A3 and the first phase first joint A1. The first phase third joint A3 is connected to the corresponding three-phase power supply lead, and the second phase stator winding and the third phase stator winding are also each connected in this manner. The first phase second joint A2 is connected to the second phase first joint B1, the second phase second joint B2 is connected to the third phase first joint C1, and the third phase second joint C2 is connected to the first phase first joint A1 to form an angular connection of the first type coil.

Figure 2:
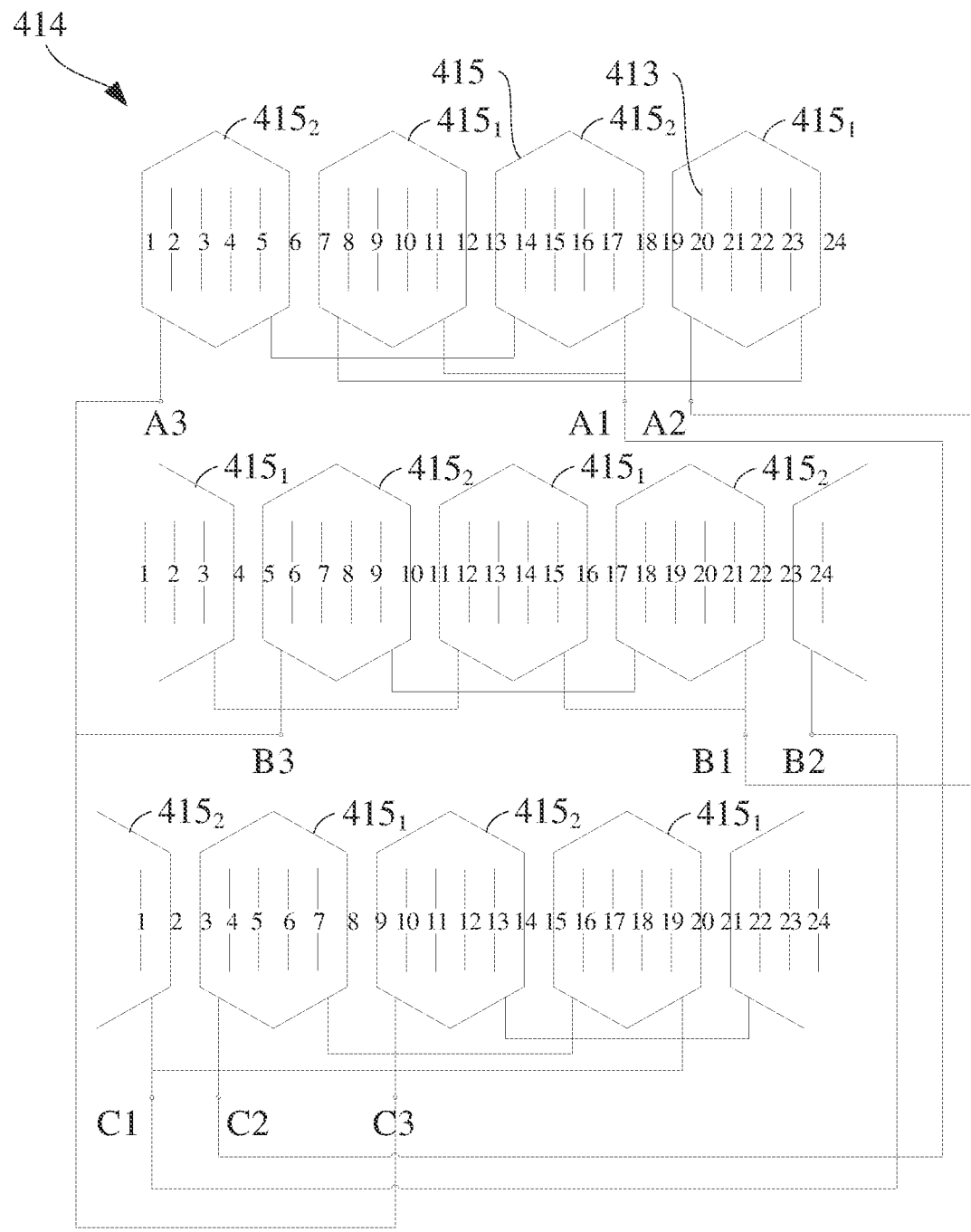
FIG. 2 is a wiring schematic diagram of the stator winding in the second embodiment of the present disclosure.

As shown in FIG. 2, in the second embodiment of the present disclosure, another connection manner of the stator winding 414 of the 4-pole 24-slot motor is provided, and the 24-slot can accommodate 12 of the coils 415, 4 for each phase. There are two of the first type coils between the first phase first joint A1 and the first phase second joint A2, and there are two of the second type coils between the first phase third joint A3 and the first phase first joint A1. The second phase stator winding and the third phase stator winding are also each connected in this manner, the first phase second joint A2 is connected to the second phase first joint B1, and the second phase second joint B2 is connected to the third phase first joint C1, the third phase second joint C2 is connected to the first phase first joint A1 to form an angular connection of the first type coil, and the three connection points formed are respectively connected to the corresponding three-phase power leads. The first phase third joint A3, the second phase third joint B3, and the third phase third joint C3 are connected.

Figure 3:
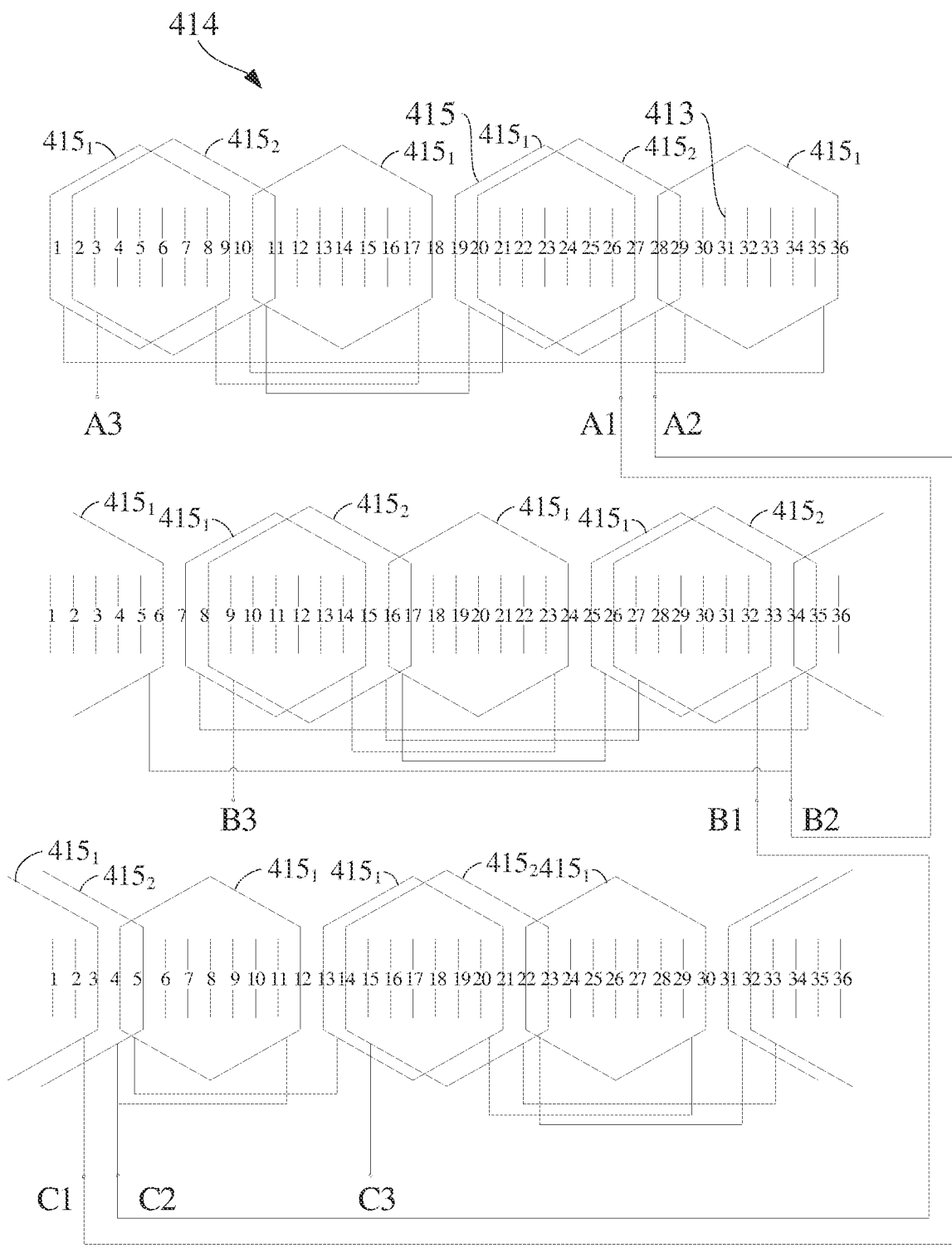
FIG. 3 is a wiring schematic diagram of the stator winding in the third embodiment of the present disclosure.

As shown in FIG. 3, in the third embodiment of the present disclosure, a connection manner of the stator winding 414 of a 4-pole 36-slot motor is provided, and the 36-slot can accommodate 18 of the coils 415, 6 for each phase. There are four of the first type coils between the first phase first joint A1 and the first phase second joint A2, and two of the second type coils between the first phase third joint A3 and the first phase second joint A2. The first phase third joint A3 is connected to the corresponding three-phase power supply lead, and the second phase stator winding and the third phase stator winding are also each connected in this manner. The first phase second joint A2 is connected to the third phase first joint C1, and the third phase second joint C2 is connected to the second phase first joint B1, the second phase second joint B2 is connected to the first phase first joint A1 to form an angular connection of the first type coil.

Figure 4:
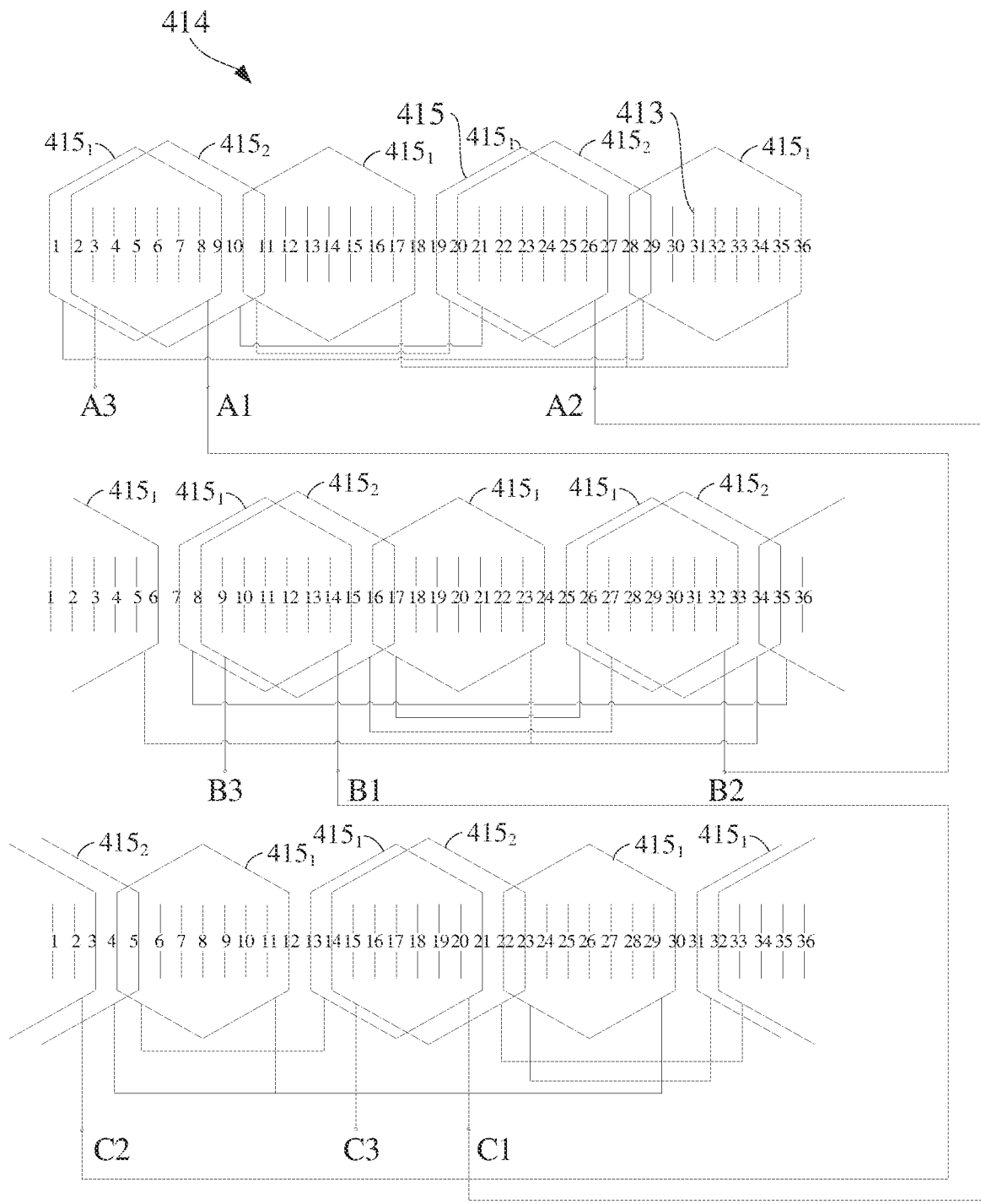
FIG. 4 is a wiring schematic diagram of the stator winding in the fourth embodiment of the present disclosure.

As shown in FIG. 4, in the fourth embodiment of the present disclosure, another connection manner of the stator winding 414 of the 4-pole 36-slot motor is provided, and the 36-slot can accommodate 18 of the coils 415, 6 for each phase. There are four of the first type coils between the first phase first joint A1 and the first phase second joint A2, and two of the second type coils between the midpoint of four of the first type coils and the first phase third joint A3. The first phase third joint A3 is connected to the corresponding three-phase power supply lead, and the second phase stator winding and the third phase stator winding are also each connected in this manner. The first phase second joint A2 is connected to the third phase first joint C1, the third phase second joint C2 is connected to the second phase first joint B1, and the second phase second joint B2 is connected to the first phase first joint A1 to form an angular connection of the first type coil.

Figure 5:
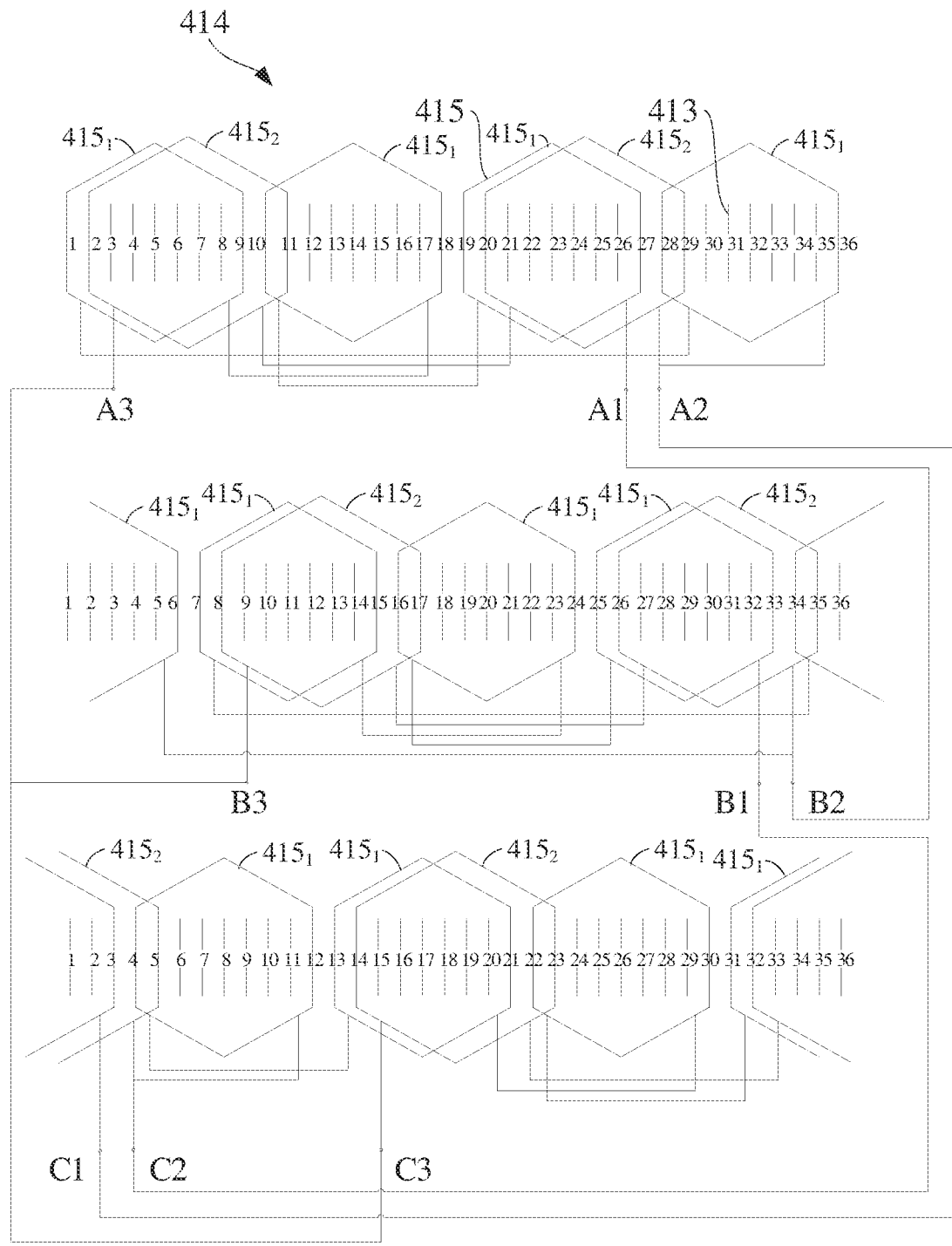
FIG. 5 is a wiring schematic diagram of the stator winding in the fifth embodiment of the present disclosure.

As shown in FIG. 5, in the fifth embodiment of the present disclosure, another manner of joint arrangement of the stator winding of the 4-pole 36-slot motor is provided, and 36-slot can accommodate 18 of the coils, 6 for each phase. There are four of the first type coils between the first joint A1 and the first phase second joint A2, and two of the second type coils between the first phase third joint A3 and the first phase second joint A2. The second phase stator winding and the third phase stator winding are also each connected in this manner. The first phase second joint A2 is connected to the third phase first joint C1, the third phase second joint C2 is connected to the second phase first joint B1, and the second phase second joint B2 is connected to the first phase first joint A1 to form an angular connection of the first type coil. The first phase third joint A3, the second phase third joint B3, and the third phase third joint C3 re connected.

Figure 6:
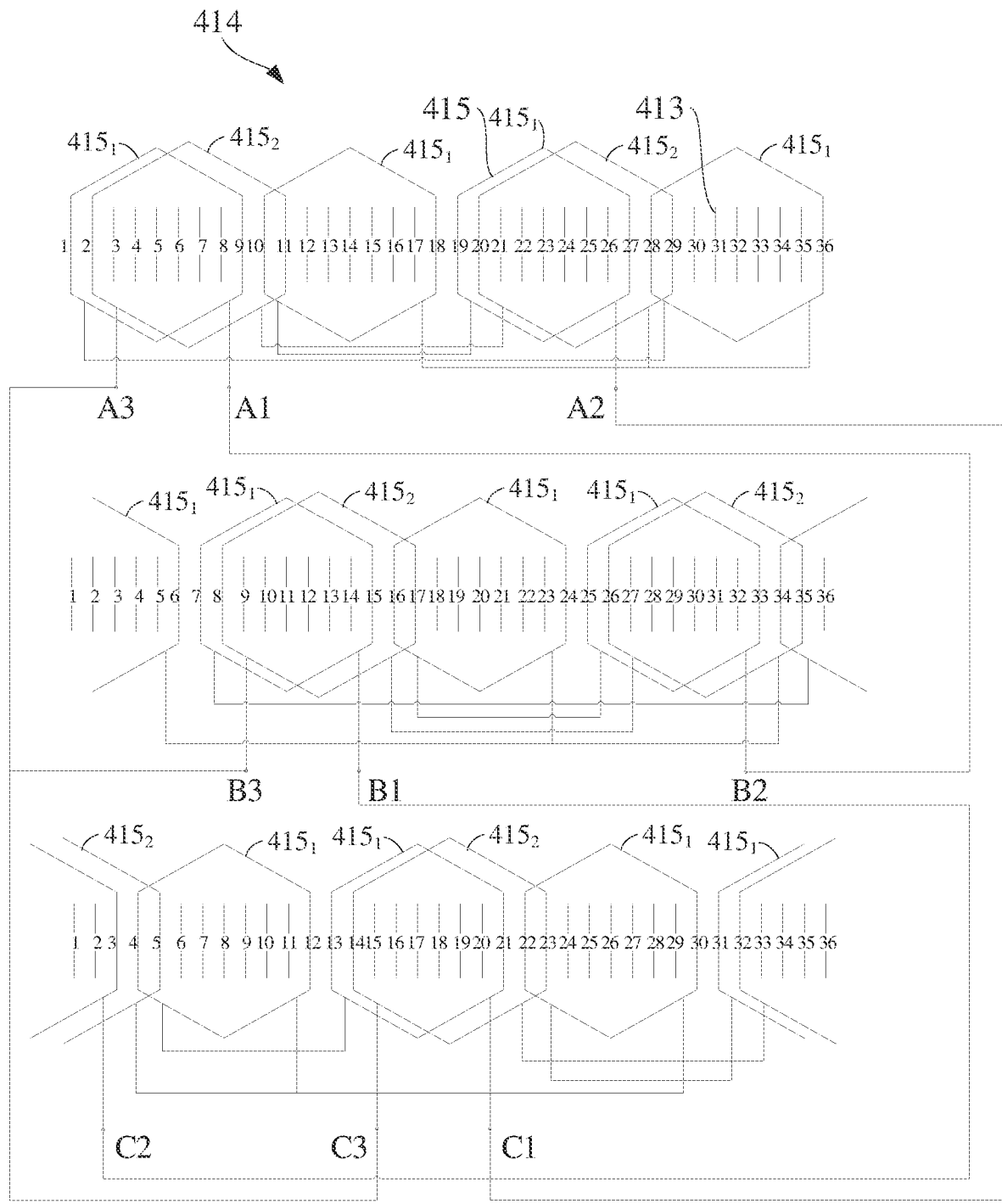
FIG. 6 is a wiring schematic diagram of the stator winding in the sixth embodiment of the present disclosure.

As shown in FIG. 6, in the sixth embodiment of the present disclosure, another connection manner of the stator winding 414 of the 4-pole 36-slot motor is provided, and the 36-slot can accommodate 18 of the coils 415, 6 for each phase. There are four of the first type coils between the first phase first joint A1 and the first phase second joint A2, and two of the second type coils between the midpoint of four the first type coils and the first phase third joint A3. The second phase stator winding and the third phase stator winding are also each connected in this manner. The first phase second joint A2 is connected to the third phase first joint C1, and the third phase second joint C2 is connected to the second phase first joint B1, the second phase second joint B2 is connected to the first phase first joint A1 to form an angular connection of the first type coil. The first phase third joint A3, the second phase third joint B3, and the third phase third joint C3 are connected.

Figure 7:
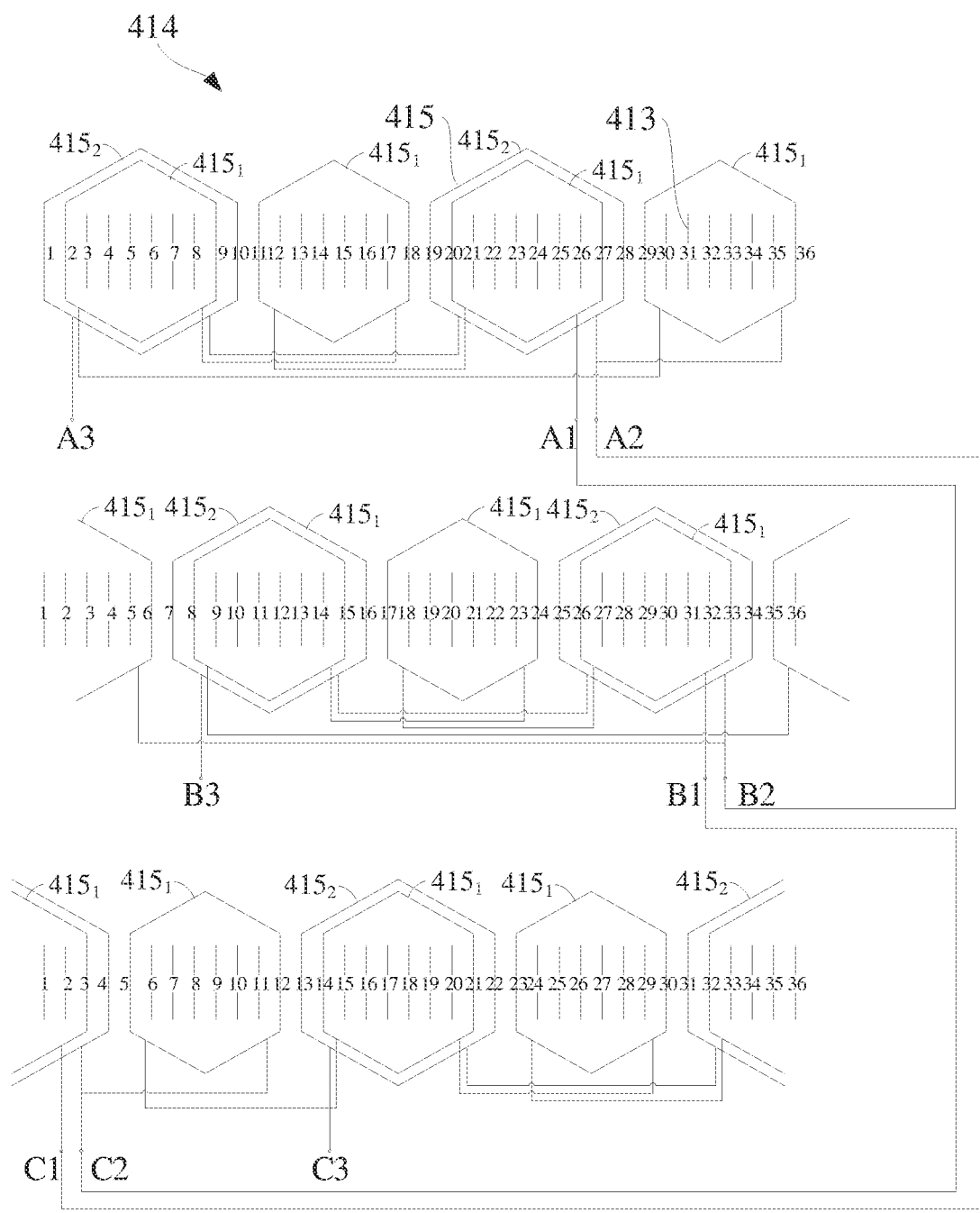
FIG. 7 is a wiring schematic diagram of the stator winding in the seventh embodiment of the present disclosure.

As shown in FIG. 7, in the seventh embodiment of the present disclosure, another connection manner of the stator winding 414 of the 4-pole 36-slot motor is provided, and the 36-slot can accommodate 18 of the coils 415, 6 for each phase. There are four of the first type coils between the first phase first joint A1 and the first phase second joint A, and two of the second type coils between the first phase third joint A3 and the first phase second joint A2. The first phase third joint A3 is connected to the corresponding three-phase power supply lead, and the second phase stator winding and the third phase stator winding are also each connected in this manner. The first phase second joint A2 is connected to the third phase first joint C1, and the third phase second joint C2 is connected to the second phase first joint B1, the second phase second joint B2 is connected to the first phase first joint A1 to form an angular connection of the first type coil.

Figure 8:
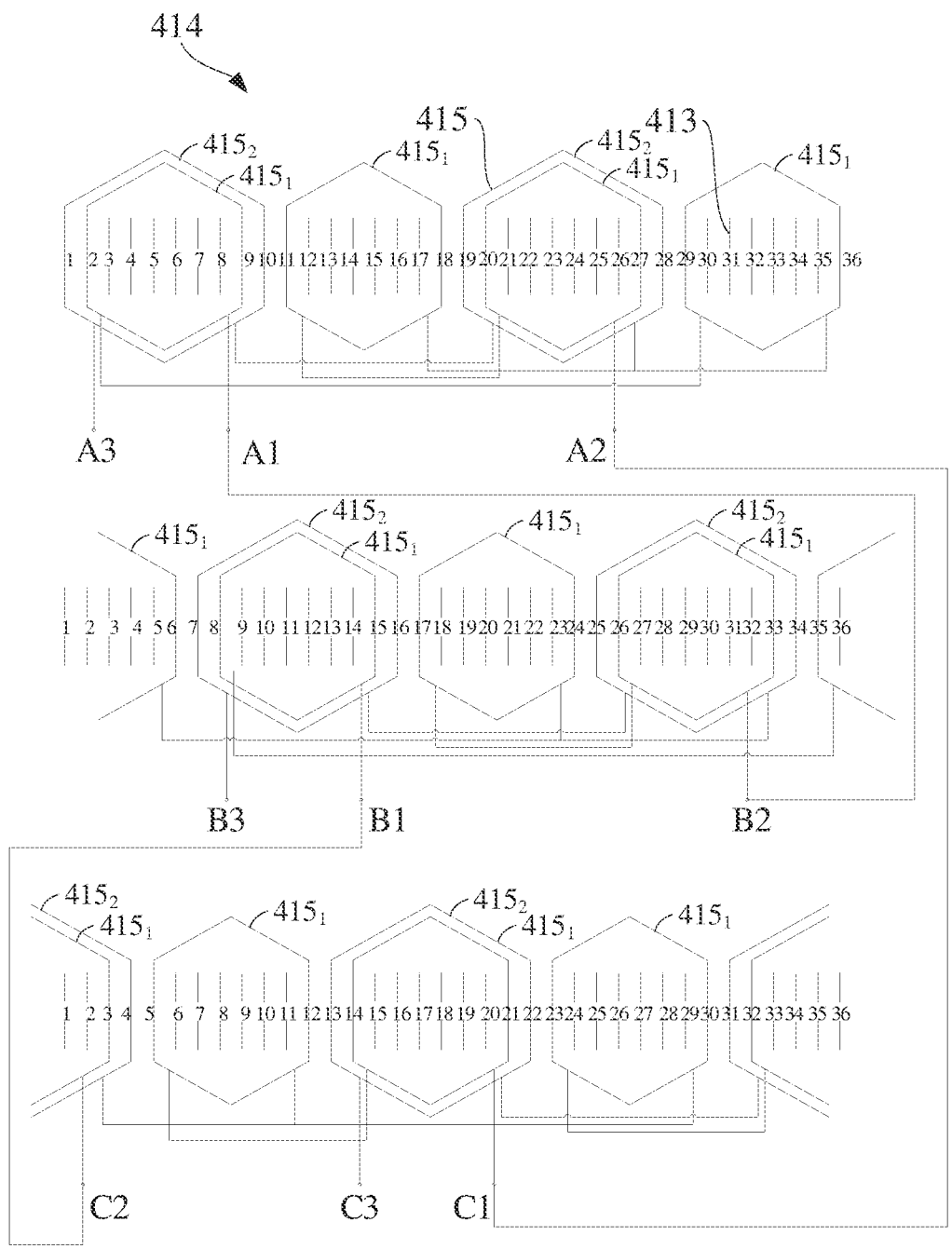
FIG. 8 is a wiring schematic diagram of the stator winding in the eighth embodiment of the present disclosure.

As shown in FIG. 8, in the eighth embodiment of the present disclosure, another connection manner of the stator winding 414 of the 4-pole 36-slot motor is provided, and the 36-slot can accommodate 18 of the coils 415, 6 for each phase. There are four of the first type coils between the first phase first joint A1 and the first phase second joint A2, and two of the second type coils between the midpoint of four the first type coils and the first phase third joint A3. The first phase third joint A3 is connected to the corresponding three-phase power lead, the second phase stator winding and the third phase stator winding are also each connected in this manner. The first phase second joint A2 is connected to the third phase first joint C1, and the third phase second joint C2 is connected to the second phase first joint B1, the second phase second joint B2 is connected to the first phase first joint A1 to form an angular connection of the first type coil.

Figure 9:
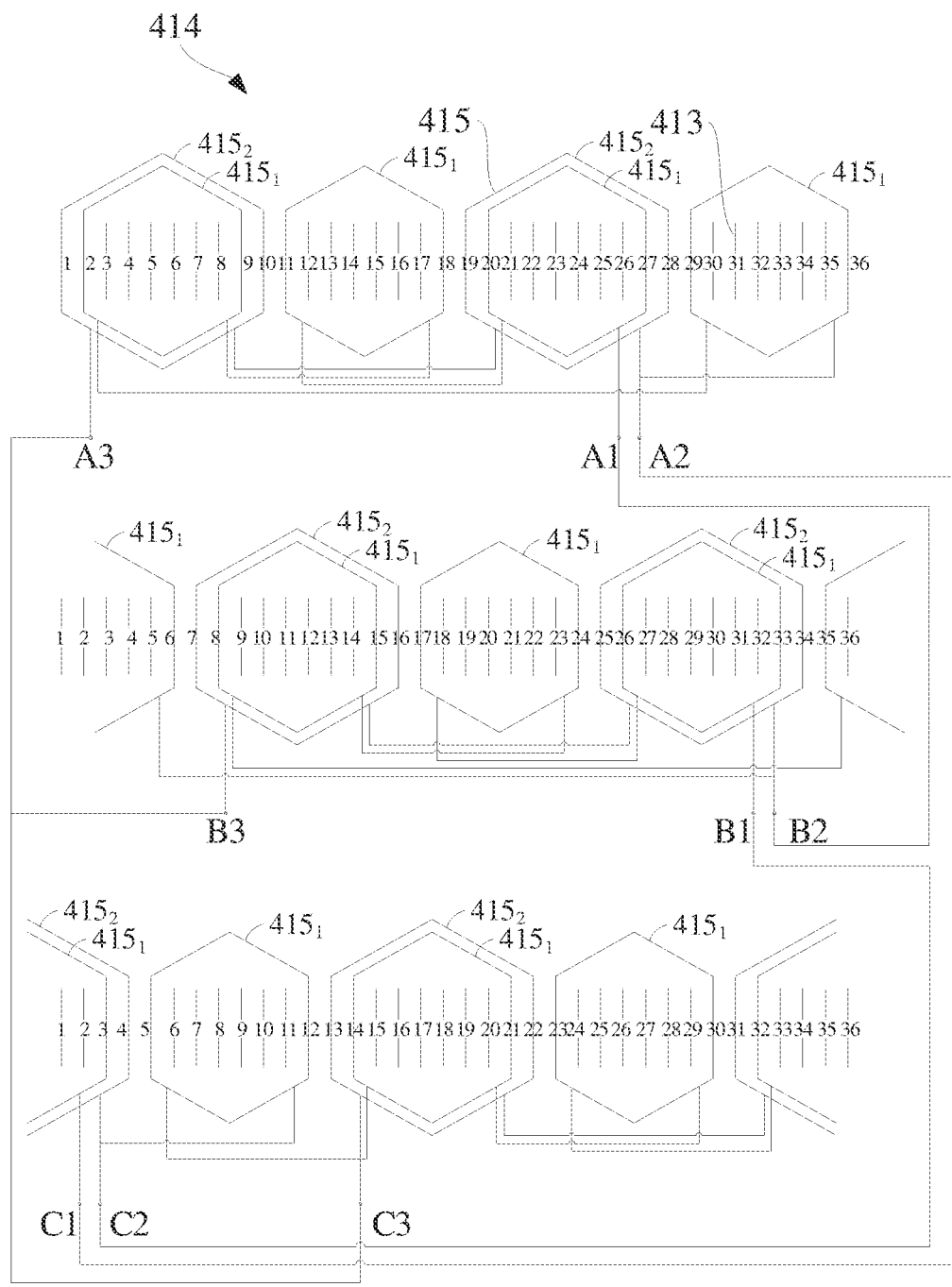
FIG. 9 is a wiring schematic diagram of the stator winding in the ninth embodiment of the present disclosure.

As shown in FIG. 9, in the ninth embodiment of the present disclosure, another connection manner of the stator winding of the 4-pole 36-slot motor is provided, and 36-slot can accommodate 18 of the coils, 6 for each phase. There are four of the first type coils between the first joint A1 and the first phase second joint A2, and two of the second type coils between the first phase third joint A3 and the first phase second joint A2. The second phase stator winding and the third phase stator winding are also each connected in this manner. The first phase second joint A2 is connected to the third phase first joint C1, and the third phase second joint C2 is connected to the second phase first joint B1, the second phase second joint B2 is connected to the first phase first joint A1 to form an angular connection of the first type coil. The first phase third joint A3, the second phase third joint B3, and the third phase third joint C3 are connected.

Figure 10:
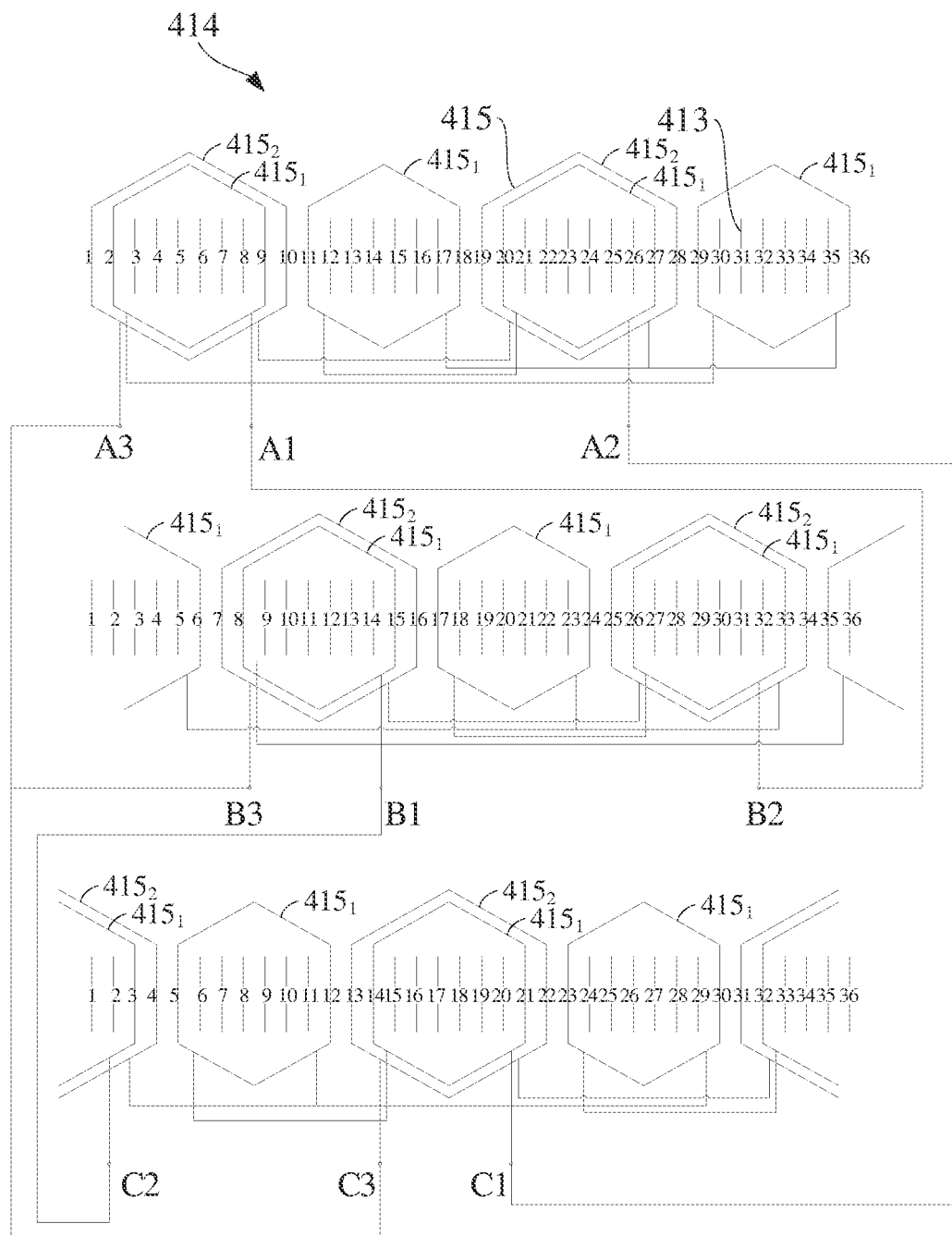
FIG. 10 is a wiring schematic diagram of the stator winding in the tenth embodiment of the present disclosure.

As shown in FIG. 10, in the tenth embodiment of the present disclosure, another connection manner of the stator winding 414 of the 4-pole 36-slot motor is provided, and the 36-slot can accommodate 18 of the coils 415, 6 for each phase. There are four of the first type coils between the first phase first joint A1 and the first phase second joint A2, and two of the second type coils between the midpoint of the four first type coils and the first phase third joint A3. The second phase stator winding and the third phase stator winding are also each connected in this manner. The first phase second joint A2 is connected to the third phase first joint C1, and the third phase second joint C2 is connected to the second phase first joint B1, the second phase second joint B2 is connected to the first phase first joint A1 to form an angular connection of the first type coil. The first phase third joint A3, the second phase third joint B3, and the third phase third joint C3 are connected.

Figure 11:
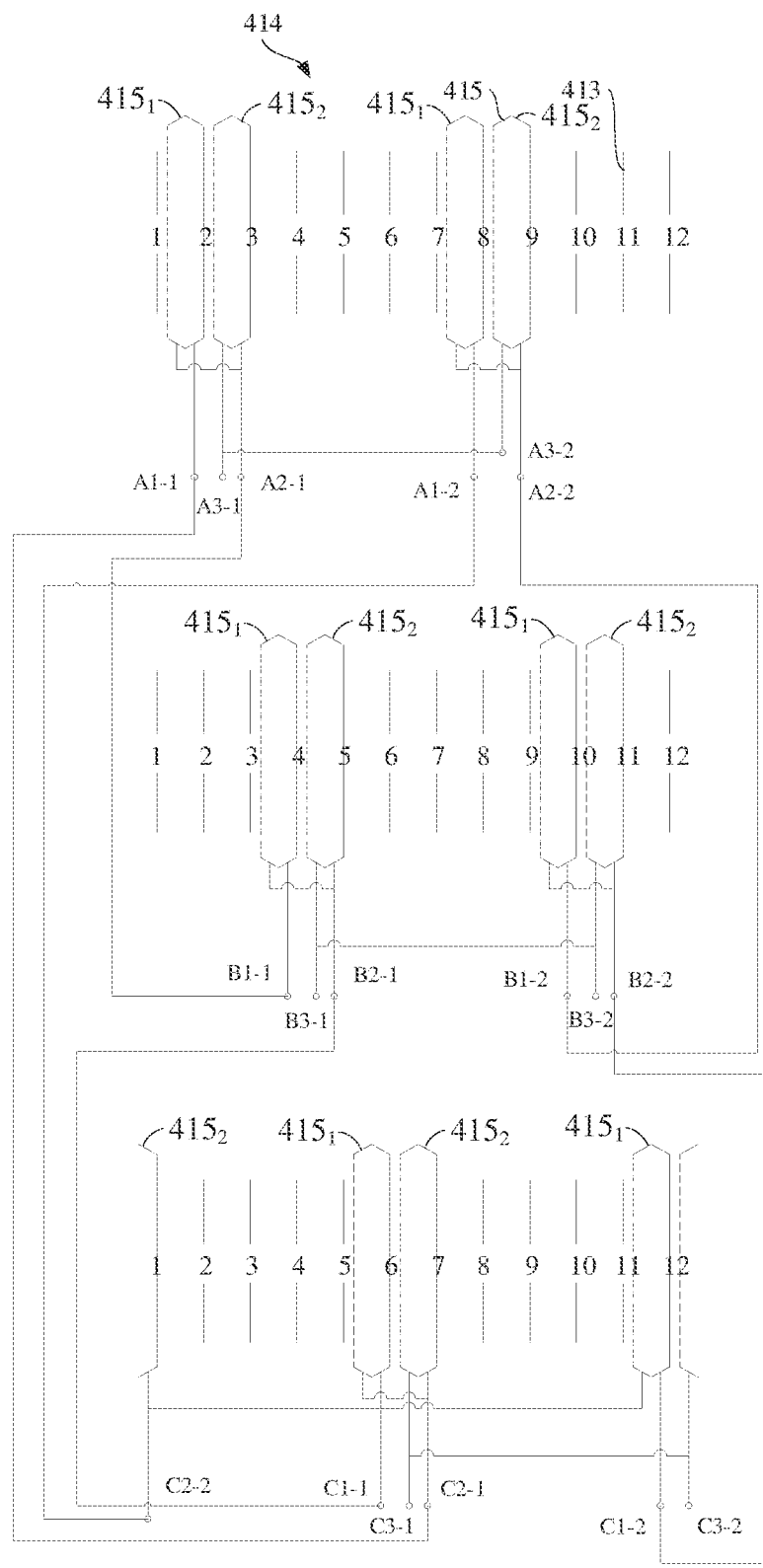
FIG. 11 is a wiring schematic diagram of the stator winding in the eleventh embodiment of the present disclosure.

As shown in FIG. 11, in the eleventh embodiment of the present disclosure, a connection manner of the stator winding 414 of the permanent magnet motor of the fractional slot concentrated winding is provided. For example, the 10-pole 12-slot motor or the 14-pole 12-slot motor is used. The 12-slot of the permanent magnet motor of the fractional slot concentrated winding can accommodate 12 of the coils 415, 4 for each phase, divided into two groups. Taking the first phase stator winding as an example, the first group coils 415 is provided with a first joint A1-1, a second joint A2-1 and a third joint A3-1, the second group coils 415 is provided with a first joint A1-2, a second joint A2-2 and a third joint A3-2. One the first type coil is respectively disposed between the first group first joint A1-1 and the first group second joint A2-1, and between the second group first joint A1-2 and the second group second joint A2-2. One the second type coil is respectively disposed between the first group second joint A2-1 and the first group third joint A3-1, and between the second group second joint A2-2 and the second group third joint A3-2. The first group third joint A3-1 and the second group third joint A3-2 are connected, such that the two groups of coils 415 are connected in parallel. The first group third joint A3-1 and the second group third joint A3-2 are connected to the corresponding three-phase power supply leads. The second phase stator winding and the third phase stator windings are also each connected in this way. The first phase first group first joint A1-1 is connected to the third phase first group second joint C2-1, the third phase first group first joint C1-1 is connected to the second phase first group second joint B2-1, the second phase first group first joint B1-1 and the first phase first group second joint A2-1 are connected to form an angular connection of the first group first type coil. Similarly, the first phase second group first joint A1-2 is connected to the third phase second group second joint C2-2, and the third phase second group first joint C1-2 is connected to the second phase second group second joint B2-2, the second phase second group first joint B1-2 and the first phase second group second joint A2-2 are connected to form an angular connection of the second group first type coil.

Figure 12:
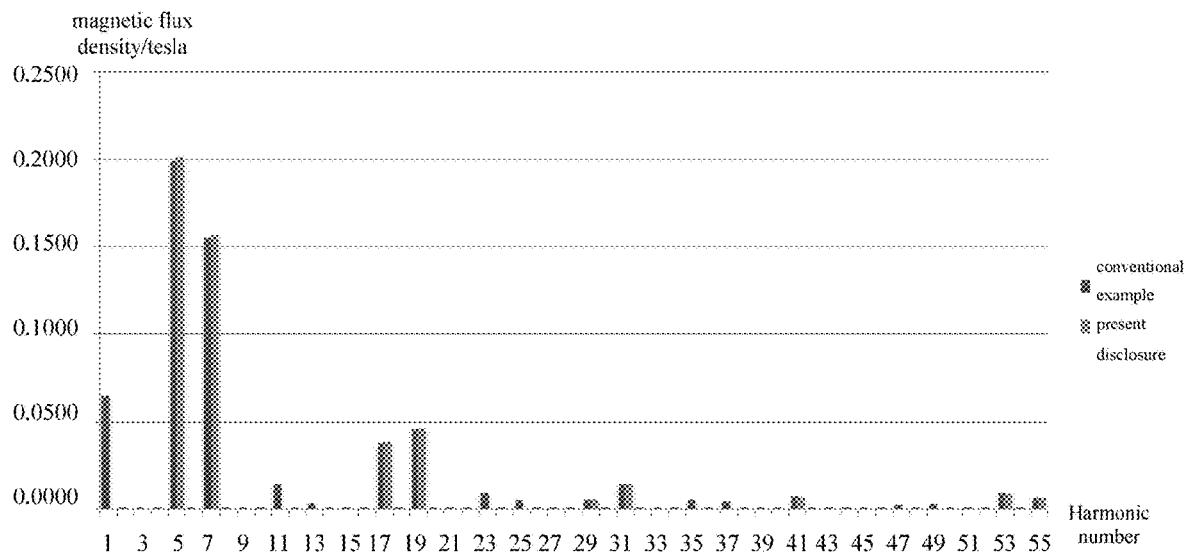
FIG. 12 is a view showing an improvement effect of the armature magnetic field harmonics of a 10-pole 12-slot motor in comparison with the conventional double-layer winding in the eleventh embodiment of the present disclosure.
Figure 13:
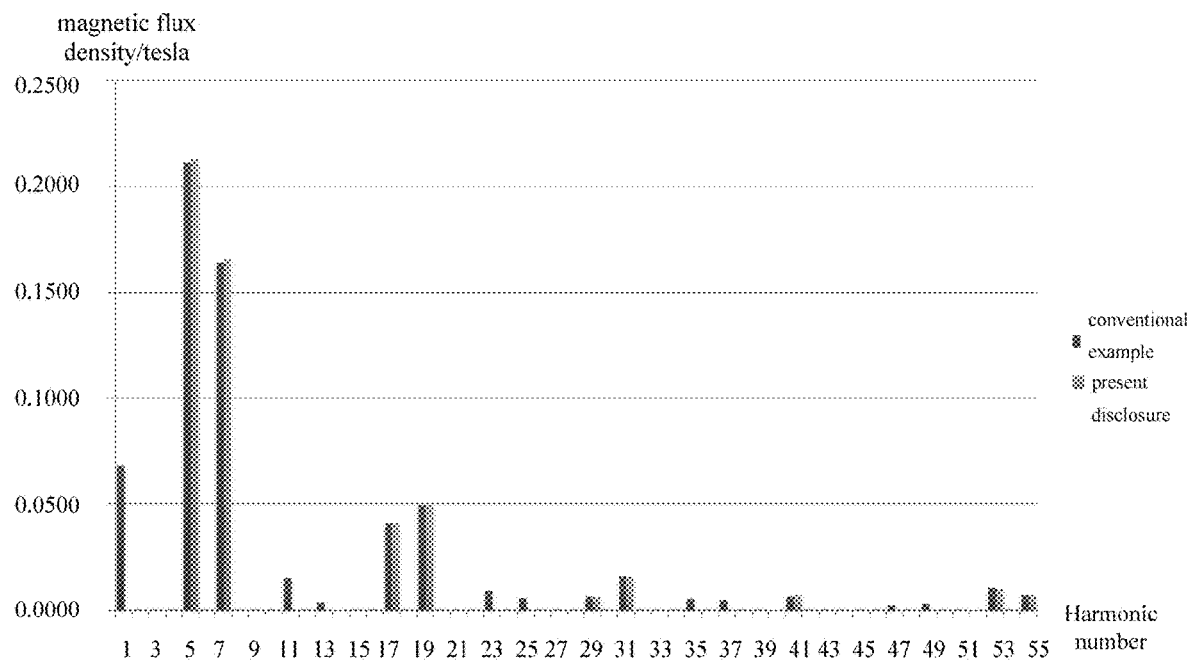
FIG. 13 is a view showing an improvement effect of the armature magnetic field harmonic of a 14-pole 12-slot motor in comparison with the conventional double-layer winding in the eleventh embodiment of the present disclosure.

As shown in FIG. 12 and FIG. 13, after adopting the present disclosure in the 10-pole 12-slot motor and the 14-pole 12-slot motor, the lowest-order armature magnetic field harmonics are completely eliminated by 100% compared with the conventional double-layer winding motor. Furthermore, the fundamental magnetic field of the motor is increased by 1.02%. In addition, the 11th, 13th, 25th, 27th, 35th, and 37th armature magnetic field harmonics are completely eliminated.

In an embodiment of the present disclosure, the ratio N2/N1 between the number of turns N2 of the second type coil and the number of turns N1 of the first type coil is in a value range of $0.49 \leq N2/N1 \leq 0.6$. In addition, the ratio d2/d1 between the bare wire diameter d2 of the second type coil and the bare wire diameter d1 of the first type coil is in a value range of $1.1 \leq d2/d1 \leq 1.6$. It has been discovered through experiments that, by providing the ratio between the numbers of turns of the coils and the ratio between the wire diameters of the coils, in accordance with the above ranges, the overall performance of the motor can be unexpectedly improved.

In this embodiment, the relationship between the number of turns of the two types of coils and the bare wire diameter is properly defined. When the coil turns are the same, the potential and magnetic potential generated by the angularly connected coil are 1.732 times lower than the potential and magnetic potential generated by the star-connected coil, causing a difference between the induced potential and the magnetic potential. By increasing the number of turns of the angularly connected coil (i.e., the first type coil), it helps to compensate for the potential and magnetic potential difference of the first type coil, making the potential and the magnetic potential of the first type coil and the second type coil more balanced. Simultaneously, the value of N2/N1 is 0.577, that is, N1/N2 is 1.732. Since the size of each stator slot is equal, by limiting the value of d2/d1 to be greater than 1, the bare wire diameter d1 of the first type coil can be reduced to correspondingly increase the number of turns N1 of the first type coil disposed in the stator slot to satisfy the ratio of the aforementioned turns. For example, the value of d2/d1 is 1.316, that is, d1/d2 is 0.76.

In any of the above embodiments, the ratio T2/T1 of the number T2 of the second type coil and the number T1 of the first type coil can be in a value range of $0.4 \leq T2/T1 \leq 1$, which further improves the overall performance of the motor unexpectedly.

In this embodiment, the number ratio of the second type coil and the first type coil is properly defined. When T2/T1 is 1, the two types of coils are equal in number, which ensures the balance of the overall structure and the reliability of the operation of the permanent magnet motor 41. By limiting the lower limit of T2/T1 to 0.4, it avoids the imbalance of the overall structure caused by the difference in the number of coils between the two types, and increases the flexibility of setting the number of coils. In the embodiment shown in FIG. 3 to FIG. 6, the stator winding 415 of each phase of the 4-pole 36-slot motor includes four of the first type coils and two of the second type coils. One of the first type coil spans eight stator teeth, and one of the second type coil spans nine stator teeth. Alternatively, as in the embodiment shown in FIG. 7 to FIG. 10, the stator winding of each phase of the 4-pole 36-slot motor has four of the first type coils and two of the second type coils. One the first type coil spans seven stator teeth, and one of the second type coil spans nine stator teeth. In other words, the span of the first type coil is smaller than the span of the second type coil, and to a certain extent, it can alleviate the structural imbalance caused by the difference in the number of coils and improve the stability of the product.

In an embodiment of the present disclosure, for example, when the number of teeth of the stator, which one of the coils 415 spans, is greater than or equal to three, the number Z of the stator slot 413 and the number P of pole pairs of the rotor 411 satisfy Z/P=6 or 12 or 16 or 18.

In this embodiment, the ratio relationship between the number Z of the stator slot 413 and the number of the pole pairs P of the rotor 411 is properly defined. The pole slot fit of the permanent magnet motor 41 is defined, the number of the pole pairs of the rotor 411 is P, and the number of the pole of the rotor 411 is 2P. The number of the stator slot 413 is 3 times, 6 times, 8 times or 9 times the number of the pole pairs of the rotor, such as, a 4-pole 12-slot motor or a 4-pole 24-slot motor as shown in FIG. 1 and FIG. 2, a 4-pole 36-slot motor as shown in FIG. 3 to FIG. 10, and a 6-pole 18-slot motor, especially the motors with a number of stator slot 413 of four. Such motors can implement the above-mentioned wiring form, so that the magnetic potential distribution generated by the stator winding 414 is uniform, which contributes to reduce harmonic rotating magnetic potential and reduce vibration noise.

In an embodiment of the present disclosure, for example, when the number of the teeth of the stator, which one of the coils 415 spans, is equal to one, the number Z of the stator slot 413 and the number P of pole pairs of the rotor 411 satisfy Z/P=2.4 or 9/4 or 12/7.

In this embodiment, the ratio relationship between the number Z of the stator slot 413 and the number P of pole pairs of the rotor 411 is properly defined. The pole slot matching of the permanent magnet motor of the fractional slot concentrated winding is further properly defined. The number of the pole pairs of the rotor 411 is P, the number of poles of the rotor 411 is 2P. For example, a 10-pole 12-slot motor or a 14-pole 12-slot motor can be used. These slot-fitted motor can achieve the effect of a multi-phase motor, which can significantly decrease the amplitude of low-order harmonic magnetic field, reduce vibration noise and improve motor performance.

Figure 14:
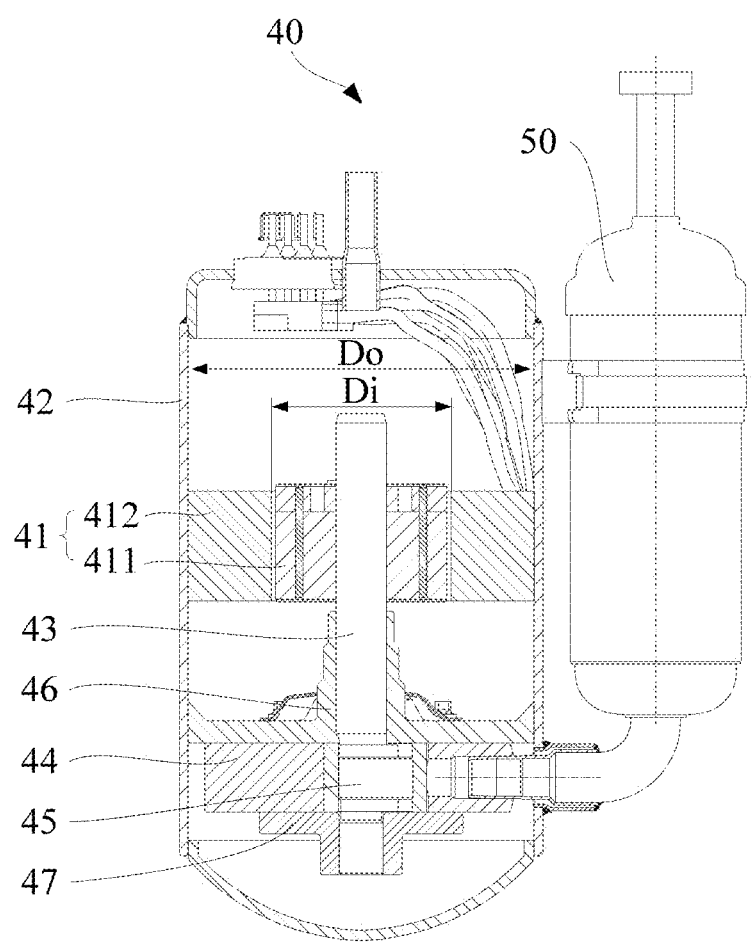
FIG. 14 is a structure schematic diagram of the compressor in the embodiment of the present disclosure.

As shown in FIG. 14, in one embodiment of the present disclosure, for example, the rated torque T of the permanent magnet motor 41, the inner diameter Di of the stator body, and the unit volume torque TPV of the rotor 411 satisfy $5.18 \times 10^{-7} \leq T \times Di^{-3} \times TPV^{-1} 1.17 \times 10^{-6}$, wherein the unit of the rated torque T is N·m, the unit of the inner diameter Di is mm, the unit of the unit volume torque TPV is kN·m·m$^{-3}$, and the unit volume torque TPV is in a value range of 5 kN·m·m$^{-3}$ ≤TPV≤ 45 kN·m·m$^{-3}$.

In this embodiment, the value range of the combined variable of the rated torque T of the permanent magnet motor 41, the inner diameter Di of the stator body, and the unit volume torque TPV of the rotor 41 are properly defined. The value range of the unit volume torque TPV is also properly defined. As a result, the permanent magnet motor 41 can meet the power needs of the compressor field. Consequently, for the compressor 40 using the permanent magnet motor 41, the copper loss and harmonic additional loss of the stator winding 414 can be effectively reduced, the motor efficiency is improved, and the vibration and noise of the motor are reduced.

As shown in FIG. 14, in an embodiment of the present disclosure, for example, the outer diameter Do of the stator core 412 is in a value range of 60 mm≤Do≤160 mm.

In this embodiment, the value range of the outer diameter Do of the stator core 412 is properly defined. The lower limit value ensures that the number of the stator slot 413 is constant, and the width is sufficient to insert a sufficient number of turns of coils 415 to ensure the normal operation of the permanent magnet motor 41. The upper limit value avoids the space occupation caused by the excessive size of the permanent magnet motor 41, so that the permanent magnet motor 41 is adapted to the compressor 40 in the domestic and commercial refrigeration systems.

In an embodiment of the present disclosure, for example, the rated rotational speed n of the permanent magnet motor is in a value range of n≥3600 rpm.

In this embodiment, the rated rotational speed of the conventional permanent magnet motor is 3,600 rpm, and the permanent magnet motor defined by the present disclosure can effectively reduce noise and significantly improve the performance of the high-speed permanent magnet motor when applied to high-speed working conditions.

In an embodiment of the present disclosure, for example, the rotor 411 includes a rotor core and a magnetic member, the rotor core includes a slot, and the number of the slot is at least one, and all of the slots are spaced apart along a circumferential direction of the rotor core, the magnetic member is disposed in the slot.

In this embodiment, a magnetic member setting scheme of the rotor 411 is properly defined. By processing the slot on the rotor core, it is possible to provide a mounting position for the magnetic member, facilitating the positioning and assembly of the magnetic member.

In an embodiment of the present disclosure, for example, the rotor 411 includes a rotor core and a magnetic member, the number of the magnetic member is plural, the magnetic member has a sheet shape, and the cross section of the magnetic member has a circular arc shape, and the magnetic member is attached to the outer wall of the rotor core.

In this embodiment, another magnetic member setting scheme of the rotor 411 is properly defined. Attaching the circular arc-shaped magnetic member to the outer wall of the rotor core simplifies the structure of the rotor core and reduces the processing of the rotor core.

In an embodiment of the present disclosure, for example, the rotor 411 includes a rotor core and a magnetic member, the magnetic member has a cylindrical shape, and is sleeved on an outer wall of the rotor core.

In this embodiment, another magnetic member setting scheme of the rotor is properly defined. The cylindrical shaped magnetic member is sleeved on the rotor core, which simplifies the structure of the rotor core and reduces the processing of the rotor core. On the other hand, the magnetic member is directly disposed on the rotor core as a whole, which is convenient for assembly.

As shown in FIG. 14, an embodiment of the second aspect of the present disclosure provides a compressor 40 comprising a permanent magnet motor 41 as described in any of the above embodiments.

The compressor 40 provided by the present disclosure includes the permanent magnet motor 41 described in any of the above embodiments, and thus has all the beneficial effects of the permanent magnet motor 41, and details are not described herein again.

As shown, the compressor 40 includes the case 42; the permanent magnet motor 41 is located in the case 42, the crankshaft 43 and the cylinder 44 are also provided in the case 42, the cylinder 44 and the permanent magnet motor 41 are simultaneously disposed on the crankshaft 43, wherein the piston 45 disposed between the cylinder 44 and the crankshaft 43, the top and bottom ends of the cylinder 44 are respectively provided with the main bearing 46 and the auxiliary bearing 47 of the crankshaft 43, the cylinder 44, the piston 45, the main bearing 46 and the auxiliary bearing 47 are combined to form a compression chamber, after the low pressure steam obtained by the separation of the external gas-liquid separator 50 enters the compression chamber of the permanent magnet motor 41, the rotational motion of the permanent magnet motor 41 is transmitted to the piston 45 via the crankshaft 43, the low pressure steam in the compression chamber is compressed into high temperature and high pressure steam.

In the present disclosure, the term "a plurality of" means two or more, unless otherwise explicitly defined. The terms "mounting", "connected", "connection", "fixing" and the like should be understood in a broad sense, for example, "connection" may be a fixed connection, a removable connection or an integral connection; the term "connected" may refer to being directly connected and may also refer to being indirectly connected through an intermediary. A person of ordinary skills in the art could understand the specific meaning of the terms in the present disclosure according to specific situations. In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A permanent magnet motor comprising:
   a rotor; and a stator core comprising:
  a stator body, having a columnar shape;
  two or more stator teeth, wherein the stator teeth are spaced apart along a circumferential direction of the stator body; and
  a stator slot, defined by two adjacent stator teeth,
the permanent magnet motor further comprising:
a stator winding comprising a plurality of coupled coils, wherein:
  the coils are disposed in the stator slot and are wound around the stator teeth,
  the coils comprise a first type coil and a second type coil,
  the stator winding is a three-phase stator winding comprising a first phase, a second phase and a third phase,
  each phase of the stator winding is provided with at least three joints, and including a first joint, a second joint, and a third joint, and
  in the stator winding of each phase, the first joint and the second joint are disposed on the first type coil, the third joint in the stator winding of each phase is disposed on the second type coil,
wherein the first joint in the stator winding of the first phase is connected to the second joint in the stator winding of the second phase, the first joint in the stator winding of the second phase is connected to the second joint in the stator winding of the third phase, and the first joint in the stator winding of the third phase is connected to the second joint in the stator winding of the first phase to form an end-to-end angular connection of the first type coil, and
wherein in the stator winding of each phase, the second type coil is connected to the first type coil by a star connection, and the third joint in the stator winding of each phase is connected to the corresponding three-phase power lead or the third joint in the stator winding of the other phase, a rated torque T of the permanent magnet motor, an inner diameter Di of the stator body, and a unit volume torque TPV of the rotor satisfy $5.18 \times 10^{-7} \leq T \times Di^{-3} \times TPV^{-1} \leq 1.17 \times 10^{-6}$, wherein a unit of the rated torque T is N·m, a unit of the inner diameter Di is mm, a unit of the unit volume torque TPV is kN·m·m$^{-3}$, and the unit volume torque TPV is in a value range of 5 kN·m·m$^{-3}$ TPV 45 kN·m·m$^{-3}$.

2. The permanent magnet motor of claim 1, wherein:
a ratio N2/N1 between a number of turns N2 of the second type coil and a number of turns N1 of the first type coil is in a range of $0.49 \leq N2/N1 \leq 0.6$;
a ratio d2/d1 between a bare wire diameter d2 of the second type coil and a bare wire diameter d1 of the first type coil is in a range of $1.1 \leq d2/d1 \leq 1.6$.

3. The permanent magnet motor of claim 2, wherein:
a ratio T2/T1 of a number T2 of the second type coil and a number T1 of the first type coil is in a range of 0.4 T2/T1≤1.

4. The permanent magnet motor of claim 1, wherein:
when a number of the teeth of the stator, which one of the coils spans, is greater than or equal to three, a number Z of the stator slot and a number P of pole pairs of the rotor satisfy Z/P=6 or 12 or 16 or 18.

5. The permanent magnet motor of claim 1, wherein:
when a number of the teeth of stator, which one of the coils spans, is equal to one, a number Z of the stator slot and a number P of pole pairs of the rotor satisfy Z/P=2.4 or 9/4 or 12/7.

6. The permanent magnet motor of claim 1, wherein:
an outer diameter Do of the stator core is in a range of 60 mm Do 160 mm.

7. The permanent magnet motor of claim 1, wherein:
a rated rotational speed n of the permanent magnet motor is in a range of n 3600 rpm.

8. A compressor comprising:
a permanent magnet motor of claim 1.

* * * * *